May 3, 1966 R. L. PASE 3,248,873
INFLATABLE IGNITER MOUNT
Filed Feb. 4, 1963
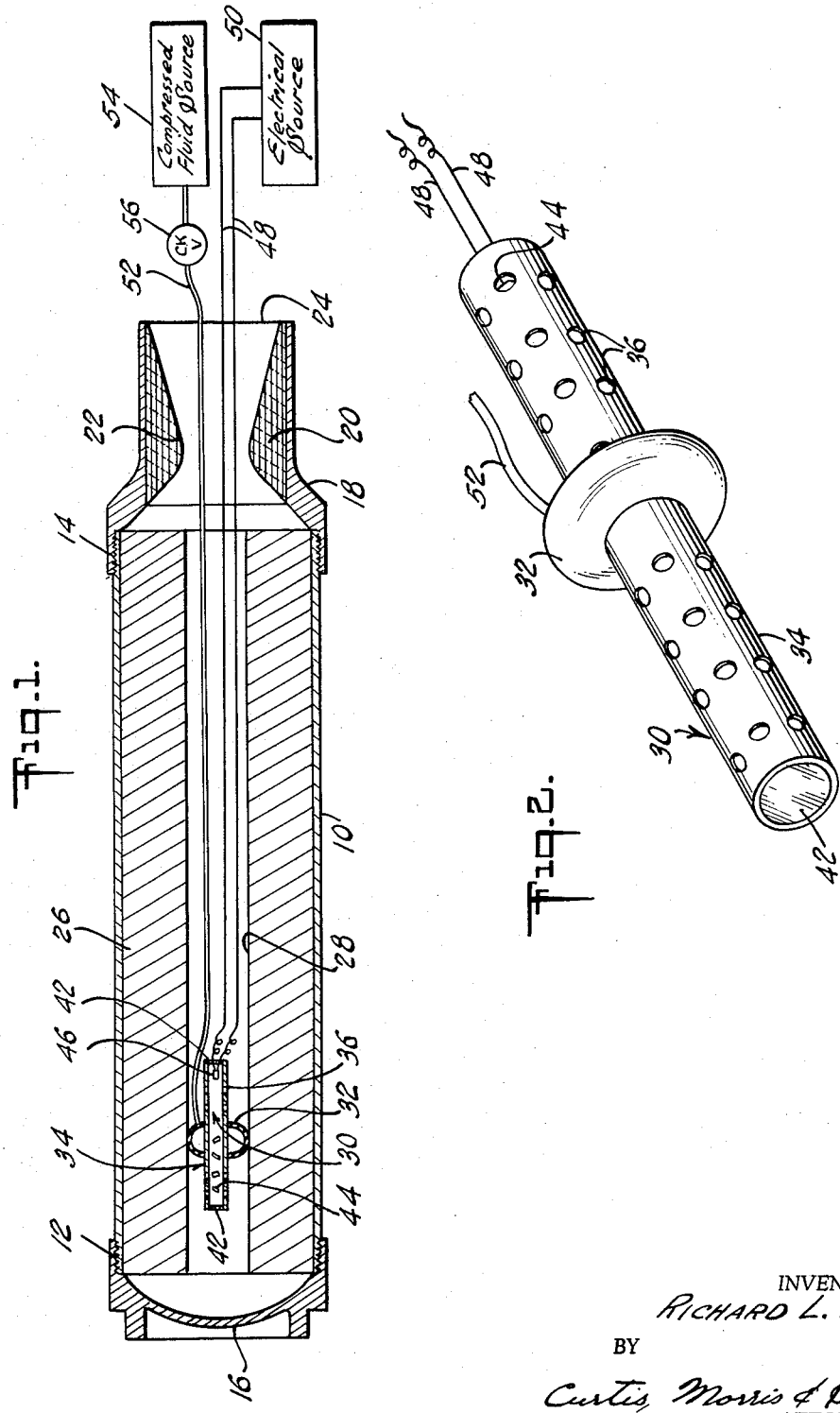
INVENTOR.
RICHARD L. PASE
BY
Curtis, Morris & Safford
ATTORNEYS.

United States Patent Office 3,248,873
Patented May 3, 1966

3,248,873
INFLATABLE IGNITER MOUNT
Richard L. Pase, Newark, Del., assignor to Thiokol Chemical Corporation, Bristol, Pa., a corporation of Delaware
Filed Feb. 4, 1963, Ser. No. 255,886
4 Claims. (Cl. 60—35.6)

The present invention relates to igniter mounts for rockets, and more particularly, to an improved inflatable igniter mount for positioning an igniter in the central cavity of the propellant grain of an internal burning solid propellant rocket engine.

In order to fire a solid propellant rocket engine, it is necessary that sufficient heat be generated to ignite a portion of the solid propellant and maintain the combustion thereof. The initial ignition of the propellant is accomplished by use of an igniter, of which there are two principal types. One type, known as a pyrotechnic igniter, is a device which contains particles of an inflammable material and an electric bridging wire arrangement called a squib. An electric current passed through the squib causes a large and rapid increase in the temperature of the bridge wire, thereby igniting the inflammable material. The burning inflammable material generates hot particles which pass out of the igniter and ignite the solid propellant in the rocket engine. This type of igniter operates in a manner similar to the method used in detonating an explosive, except the inflammable material within the igniter burns at a relatively slow rate instead of exploding.

The other principal type of igniter, known as a pyrogen igniter, is essentially a miniature rocket. It usually comprises an elongated casing having a discharge nozzle at the end, a body of combustible gas-generating material within the casing and a pyrotechnic igniter including a squib. Upon energization of the squib, the inflammable material of the pyrotechnic igniter is ignited and in turn ignites the gas-generating material to form hot gases that flow out through the igniter nozzle. The igniter is so positioned in relation to the propellant grain of the rocket that the hot gases emanating from the igniter impinge upon the propellant grain and ignite it. Thus, the pyrogen igniter may be thought of as a rocket within a rocket.

As is well known, solid propellant grains used in rockets are commonly of generally cylindrical shape with a central longitudinal passage extending therethrough. Ignition of the propellant is effected by positioning an igniter in this passage near the head end of the rocket. The igniter is introduced into the rocket through the discharge nozzle thereof, and mechanical means are currently used to mount the igniter at the desired location within the propellant grain. For example, spring-loaded locking pins, which are retracted while the igniter is inserted into the rocket engine, hold the igniter within the engine. The springs are released when the igniter is in position, thereby setting the pins which secure the igniter at the desired position within the engine. The clearance between the igniter and propellant grain is relatively small with this type of mounting because of the arrangement of the locking pins.

There are several disadvantages associated with the use of mechanical mounting means such as spring-loaded pins described above. The igniter or the mounting device may touch the solid propellant when the igniter is being put into or taken out of the rocket engine and cause damage to the propellant grain. The propellant grain may also be damaged when the locking pins are released if the igniter is not properly positioned within the rocket engine. Another danger is that metallic parts of the igniter or mounting device may strike metal elements within the rocket engine and cause sparks which could prematurely ignite the rocket propellant. In view of these possibilities, skilled personnel using great care are required to load and unload the igniters which are presently in use. Another disadvantage of the presently used igniters is that metal parts from the igniter or the mounting device may be blown through the rocket engine during firing and cause damage to the propellant grain and the rocket engine nozzle.

Accordingly, an object of the present invention is to provide an improved igniter mounting device for solid propellant rocket engines. Another object of the present invention is to provide an igniter mounting device which is easily installed and removed by relatively unskilled personnel with little danger of damage to the propellant grain or of premature ignition caused by sparks. A further object is to provide an improved method of installing an igniter within a rocket engine. Another object of the present invention is to provide an inexpensive igniter mounting device. Other objects of the invention will be in part discussed hereafter and in part obvious to those skilled in the art.

According to the present invention, an inflatable mounting device is used to mount an igniter within a rocket engine. The inflatable mounting device is collapsed during insertion of the igniter and mounting device into the rocket engine, and thereafter inflated to position the igniter at the desired location within the propellant grain.

The use of such an inflatable mounting for an igniter provides a number of advantages over prior igniter mountings. A relatively large space is left between the igniter and the propellant grain during insertion of the igniter. Because of the large clearance, the chance of the igniter or mounting device accidentally touching and damaging the propellant grain is reduced. Relatively unskilled personnel can install or remove the present igniter and mounting device. Moreover, since the igniter and the inflatable mounting device can be constructed of non-metallic combustible materials, the danger of premature ignition of the rocket by sparks from an accidental contact between metal parts of the igniter and metal parts of the rocket is eliminated. Furthermore, since all the parts of the igniter and the mounting device can be made of combustible materials, the danger of damage to the propellant grain or the rocket nozzle due to metal parts being blown through the rocket engine can be eliminated. Also, there is no need for a mount boss, an aperture or special machining in the head of the rocket engine when the present inflatable mounting device is used. Thus, the expense of fabricating the rocket is reduced so that the present mounting device is particularly suitable for low-cost sounding rockets.

In order to point out more fully the nature of the present invention, reference will now be made to the accompanying drawing which illustrates apparatus incorporating a preferred embodiment of the invention and adapted to be used in carrying out the method of the invention.

In the drawings:

FIGURE 1 is a longitudinal axial section through a rocket engine which contains a hollow solid propellant grain and shows, in the cavity of the propellant grain, an igniter mounted by means of a pneumatically inflated igniter-mounting device.

FIGURE 2 is a perspective view of the igniter on an enlarged scale further showing the construction of the igniter and its mounting.

Referring to FIGURE 1, the rocket engine there shown comprises a cylindrical metal casing 10 having the externally threaded ends 12 and 14. Threaded on the end 12 of the casing 10 is a dished metal head 16. The opposite end 14 of the casing 10 has an internally threaded nozzle assembly 18 screwed thereon. Within the nozzle 18 is bonded a nozzle insert 20 made of a refractory material, and forming the throat 22 of the nozzle and the mouth 24 of the rocket. To the inner surface of the casing 10 is bonded a solid propellant grain 26 which defines a hollow cavity 28 along the longitudinal axis of the casing 10. Within the cavity 28 near the head 16 of the rocket engine is mounted an igniter 30. The igniter 30 is mounted and held in position within the cavity 28 by means of an inflated mounting device 32. The mounting device 32 is inflated to an extent sufficient to cause it to make firm contact with both the propellant grain 26 and the igniter 30, thereby securing the igniter 30 within the cavity 28.

Referring to FIGURE 1 still and also to FIGURE 2, the igniter 30 consists of a cylindrical casing 34 having a plurality of perforations 36 which allow hot gases and burning particles to pass out of the igniter 30 and ignite the propellant 26. The ends of igniter casing 34 are closed by means of the discs 42. Within the igniter casing 34 are pellets of a highly inflammable material 44, preferably pellets of a boron and potassium nitrate mixture. The pellets 44 are of such size that they do not pass through the perforations 36. Also within the igniter casing 34 there is a squib 46, which is a known device (details not shown) consisting of a wire bridged between two terminals, used to ignite the pellets 44. The igniter 30 is activated when the pellets 44 are ignited by energizing the squib 46 through lead wires 48 connected thereto. As shown in FIGURE 1, the lead wires 48 extend from igniter 30 through cavity 28, out through nozzle 18 and are connected to a source of electrical energy 50 outside the rocket.

The igniter casing 34 is peripherally surrounded by the inflatable mounting device 32 at a point about midway between the ends of the casing. The device 32 may be inflated with a fluid under pressure, e.g., compressed air supplied through a preferably flexible pressure line 52 which extends from the mounting 32 through cavity 28 and nozzle 18 to an external source 54 of pressure fluid. The pressure line 52 is equipped with a check valve 56 which retains the pressure fluid within the inflated mounting device 32 and permits disconnection of the compressed gas source 54.

The inflatable igniter mounting device 32 and pressure supply conduit 52 are preferably made of rubber although other flexible, non-porous, combustible materials may be used. The igniter casing 34 is preferably constructed of a plastic which is rigid, nonthermoplastic and combustible at relatively high temperatures.

The degree of inflation, and therefore the rigidity, of the inflated mounting device 32 is dependent, in part, on the magnitude of the acceleration immediately after the rocket is fired during which time the igniter 30 must be held in position within the rocket engine. The amount of acceleration and length of time the igniter 30 must continue to be held in position will be known to persons skilled in the art. These considerations, however, may impose a limitation on the suitability of the present invention for use in other than the initial stage of multi-stage rocket engines.

It will of course be understood that the specific embodiment described above may be modified in various ways within the scope of the invention. For example, the perforations in the igniter casing need not be located in any particular pattern and can vary in size. The pattern and size of the perforations are governed by the necessities of retaining the pellets of inflammable material within the igniter casing and allowing free passage of the gases and hot particles out of the igniter casing in a relatively uniform circumferential manner. The perforations need not be circular in configuration. Also, the igniter casing can be imperforate if it is constructed of a readily combustible material which will ignite and burn simultaneously with the pellets of inflammable material within the casing. The inflatable mounting device need not be bonded to the igniter casing. The only requirement in this respect is a practical one that the mounting device, when deflated, remain in place on the igniter casing while the igniter is being put into or taken out of the rocket engine. More than one inflatable mounting device can be used to mount the igniter within the rocket engine. The number of inflatable mounting devices used, and the relative sizes of the mounting device and the igniter will be determined by practical considerations which will be apparent to persons skilled in the art.

It is of course to be understood that the embodiment of the invention described above is not intended to limit in any way the scope of the present invention and that numerous changes can be made by persons skilled in the art without departing from the spirit of the invention as defined in the claims hereafter appended.

I claim:
1. A solid propellant rocket engine comprising, in combination, a rocket engine casing; a solid propellant grain within said casing, said grain having a cavity extending longitudinally through the center thereof; an igniter for said propellant mounted within said cavity and spaced away from said grain, said igniter having a rigid combustible substantially cylindrical casing with a plurality of perforations therein, a plurality of pellets of an inflammable material within said igniter casing for igniting said propellant, and means within said igniter casing electrically energizable from a source external to said engine for igniting said pellets; and inflatable means in said cavity between said grain and said igniter casing peripherally surrounding and secured to a non-perforated portion of said igniter casing, said inflatable means being inflated with a compressed gas to bear against said grain whereby said igniter is firmly held in position within said rocket engine by said inflatable means.

2. A combination as defined in claim 1 wherein said inflatable means is rubber, is substantially annular and is bonded to said igniter casing.

3. A combination as defined in claim 1 wherein said inflatable means is located with respect to the length of said igniter casing about mid-way between the ends thereof.

4. A combination as defined in claim 1 wherein said inflammable pellets are a boron and potassium nitrate mixture and are larger than said perforations whereby they are retained in said igniter casing.

References Cited by the Examiner

UNITED STATES PATENTS

| | | | |
|---|---|---|---|
| 2,712,270 | 7/1955 | Green | 60—35.6 |
| 2,974,596 | 3/1961 | Allen | 60—35.6 |
| 3,003,419 | 10/1961 | Fite | 60—39.82 |
| 3,009,385 | 11/1961 | Burnside | 60—35.6 |
| 3,151,447 | 10/1964 | Bornstein | 60—35.6 |

MARK NEWMAN, *Primary Examiner.*

SAMUEL DEVINE, *Examiner.*

C. R. CROYLE, D. HART, *Assistant Examiners.*